United States Patent [19]
Waldron

[11] 3,790,144
[45] Feb. 5, 1974

[54] TUBE AND PIPE CUTTING MACHINE
[75] Inventor: David W. Waldron, Valdosta, Ga.
[73] Assignee: Lowndes Engineering Co., Inc., Valdosta, Ga.
[22] Filed: Jan. 10, 1972
[21] Appl. No.: 216,394

[52] U.S. Cl............................ 266/23 E, 266/23 NN
[51] Int. Cl.............................................. B23k 7/04
[58] Field of Search .... 266/23 R, 23 B, 23 E, 23 N, 266/23 NN

[56] References Cited
UNITED STATES PATENTS

| | | | |
|---|---|---|---|
| 2,295,229 | 9/1942 | McGuire | 266/23 NN |
| 2,495,360 | 1/1950 | Young | 266/23 N |
| 2,295,182 | 9/1942 | Norton | 266/23 NN |
| 2,035,765 | 3/1936 | Schmidt | 266/23 NN |
| 2,508,730 | 5/1950 | Stone | 266/23 L |

FOREIGN PATENTS OR APPLICATIONS

| | | | |
|---|---|---|---|
| 880,444 | 10/1961 | Great Britain | 266/23 NN |
| 1,209,212 | 10/1970 | Great Britain | 266/23 E |

Primary Examiner—Gerald A. Dost
Attorney, Agent, or Firm—Netown, Hopkins & Ormsby

[57] ABSTRACT

Apparatus for use in making a predetermined cut on a tubular workpiece corresponding to pattern control means. The apparatus includes a base frame for supporting a workpiece and a pattern in fixed relationship with each other, with the supporting means detailed to permit coordinated movement of the workpiece and pattern relative to the base frame means. A carriage assembly is supported on the base frame for movement relative thereto and movement relative to the workpiece and pattern. The carriage assembly includes a drive means operatively associated with the pattern for effecting the coordinated movement of the pattern and workpiece and for effecting movement of the carriage in a cutting operation. Cutting means is supported on the carriage and is detailed for movement relative the workpiece in response to the coordinated movement effected by the drive means. The cutting means is operable for making a predetermined cut in the workpiece corresponding to the pattern control means.

2 Claims, 7 Drawing Figures

TUBE AND PIPE CUTTING MACHINE

BACKGROUND OF THE INVENTION

This invention relates to apparatus for use in making a cut in a workpiece and is particularly concerned with making complementary cuts in tubular metal stock members, whereby the cut metal stock members can be welded in abutting engagement with each other to define angularly disposed flow passageways.

In the construction of fluid or gas flow passageways utilizing tubular metal stock means, it is often necessary to connect two tubular members in angular relationship relative to each other whereby the fluid or gas can be conducted along angularly disposed passageways. These angularly disposed tubular members are normally connected along their abutting surfaces by welding. However, it is difficult to make predetermined accurate cuts in each of the tubular members whereby their abutting surfaces will be complementary to each other for receiving a weld which will effectively seal the joint.

One way of making a cut in a tubular member is by utilizing a pattern, marking the tubular member to be cut and then utilizing cutting means to cut along the marked lines, with the cutting being controlled by hand guided movement along the marked lines.

There have been a number of attempts to provide cutting apparatus which will effectively cut tubular members in predetermined shapes for connection with adjacent tubular shaped members. However, the prior art tubular cutting apparatus are complex in construction, uneconomical to manufacture and unreliable in operation.

SUMMARY OF THE INVENTION

The above disadvantages of the prior art have been overcome by the present invention which basically includes a base supporting frame having means for supporting a tubular workpiece in fixed relationship with pattern control means, whereby the pattern and workpiece can be rotated about a common axis during a cutting operation. Rotary movement of the pattern and tubular workpiece is effected by means of a drive assembly which includes a knurled or frictional drive element supported in abutting engagement with the pattern. A rotary movement of the knurled frictional element will effect rotary movement of the workpiece and pattern and will also effect horizontal adjustment of a cutting torch which is supported in position to make a predetermined cut corresponding to the pattern in response to the rotary movement of the workpiece and horizontal adjustment of the cutting means. An important feature of the present invention is the utilization of magnetic attraction means between the knurled drive element and the pattern control means, whereby the magnetic attraction will effect the horizontal adjustment of the cutting torch.

It is therefore a primary object of the present invention to provide apparatus for use in making predetermined cuts in tubular workpieces, corresponding to pattern control means, wherein the cuts are automatically made under controlled movement of the pattern, workpiece and cutting means.

A further object of the present invention is to provide apparatus which can be utilized for supporting and effecting a cutting operation on a number of various sized tubular members.

Another object of the present invention is to provide apparatus which can make a selected one of a plurality of cuts in a tubular member corresponding to a complementary pattern control means.

Still another object of the present invention is to provide a support means for supporting a pattern and tubular workpiece member in fixed relationship relative to each other for rotary movement about a common axis in a cutting operation.

Yet another object of the present invention is to provide means for rotating pattern and tubular workpiece to be cut, utilizing frictional engagement of a drive member to effect rotation of the pattern and workpiece.

A still further object of the present invention is to provide drive means utilizing magnetic attraction means for effecting controlled adjustment of workpiece cutting means.

A further object of the present invention is to provide a support means for supporting a cutting means in a selected vertically adjusted position relative to a workpiece.

An additional object of the present invention is to provide apparatus for use in making selected predetermined cuts in tubular workpieces, which apparatus is simple in construction and operation, economical to manufacture and reliable in performance.

These and other objects and advantages of the details of construction will become apparent upon reading the following description of the illustrative embodiment of the present invention, with reference to the attached drawing wherein like reference numerals have been used to refer to like parts throughout the several figures, and wherein:

DESCRIPTION OF THE ILLUSTRATIVE EMBODIMENT

Figure 1:
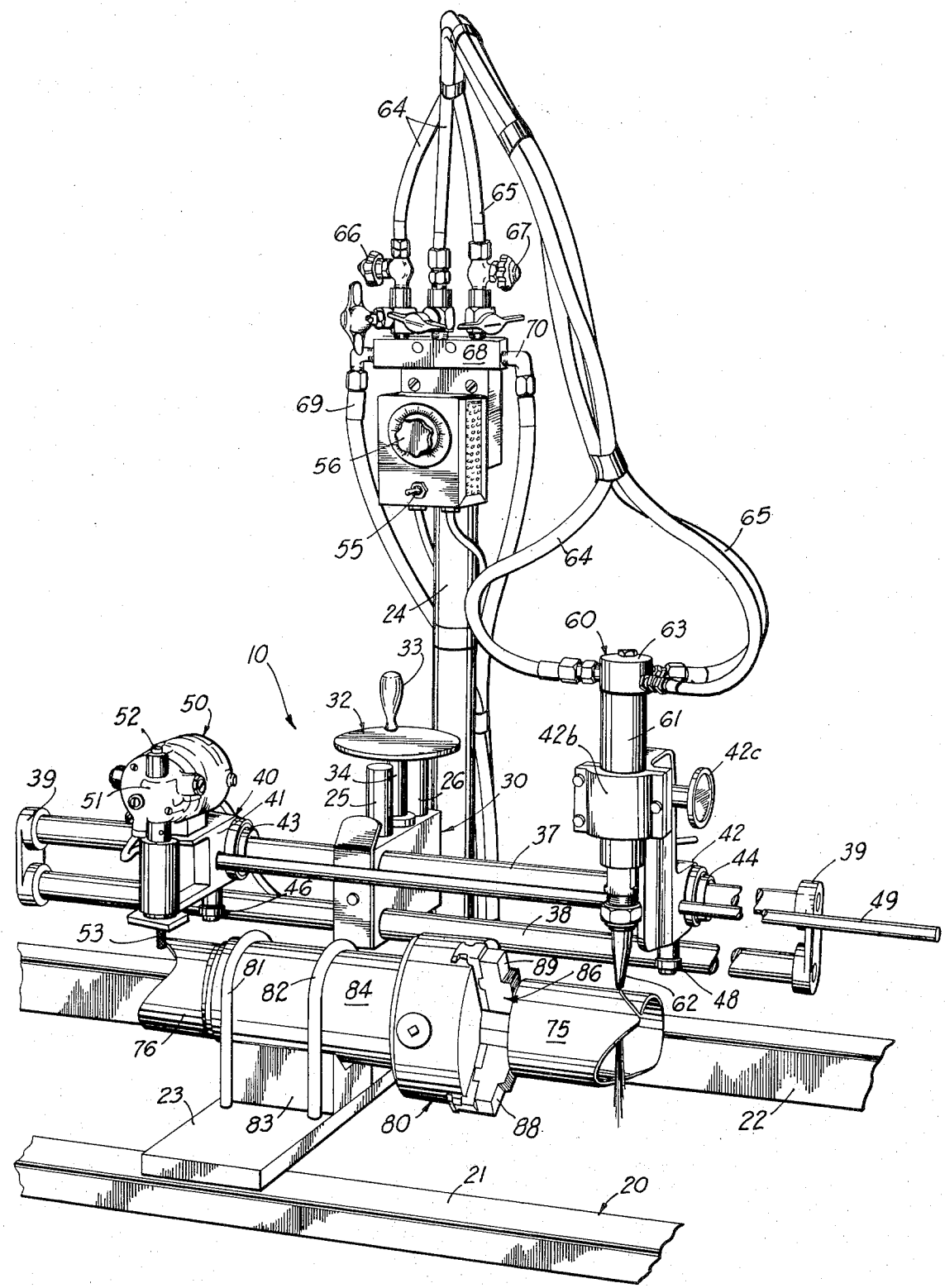
FIG. 1 is a perspective view showing a cutting apparatus embodying the principles of the present invention.

Referring now to the drawing, the cutting apparatus embodying the principles of the present invention is shown in FIG. 1 and generally represented by the reference numeral 10. The cutting apparatus will be described with reference to a base frame means 20; an adjustable carriage support frame 30; a carriage assembly 40 having a drive mechanism 50; a cutting means 60; and, a workpiece and pattern holding means 80.

Figure 2:
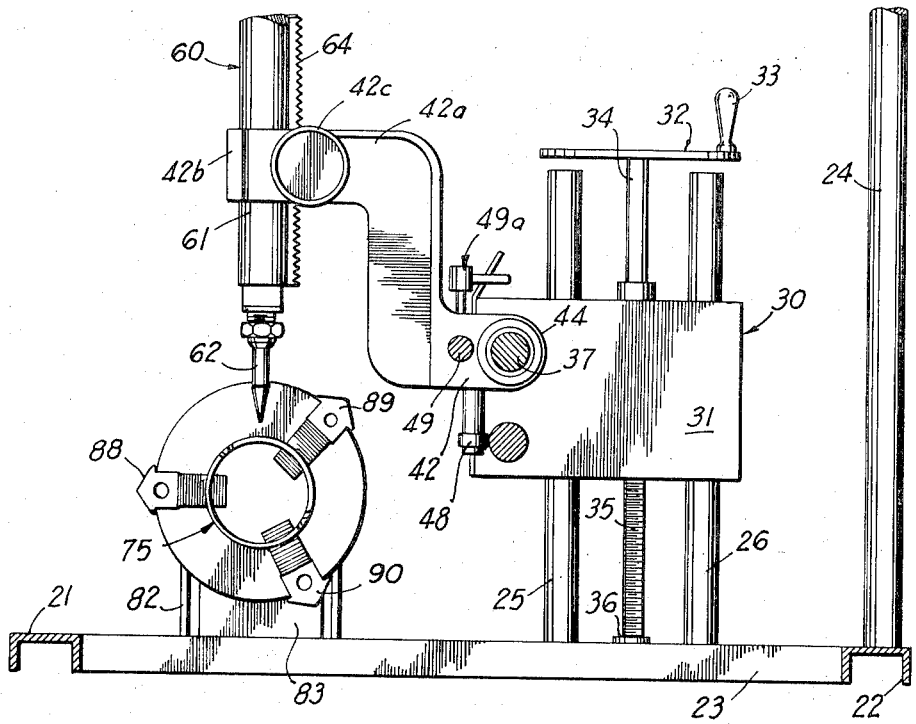
FIG. 2 is an enlarged end elevational view of the cutting apparatus shown in FIG. 1, as seen from the right, with certain parts being omitted and certain parts broken away and shown in section for purpose of clarity.
Figure 3:
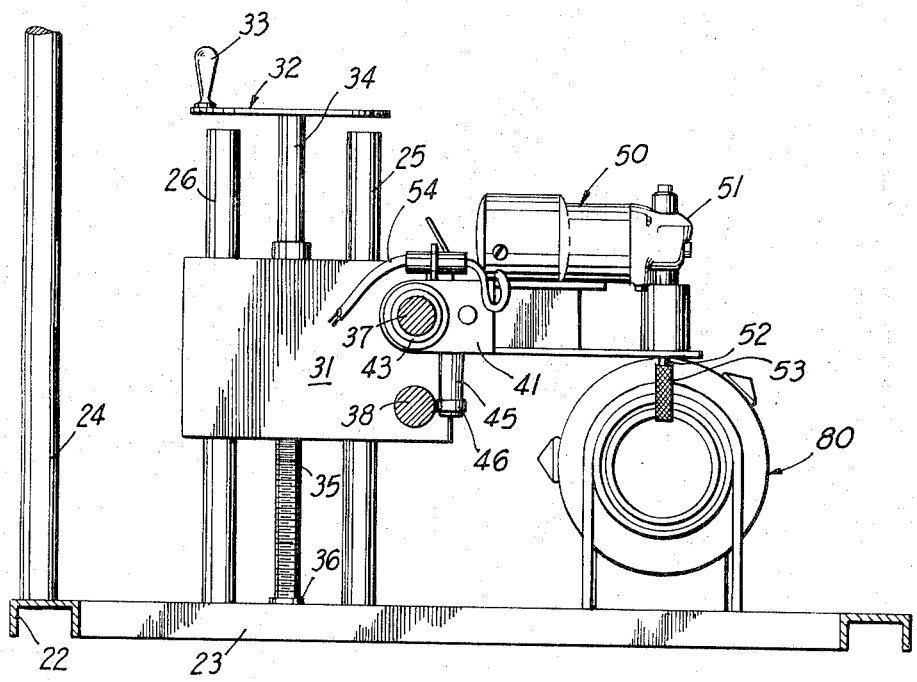
FIG. 3 is an enlarged end elevational view as seen from the left of FIG. 1, with certain parts omitted and certain parts broken away and shown in section for purpose of clarity.

The base frame means 20 is constructed of conventional metal stock material and includes a pair of horizontally oriented frame support elements 21, 22 which are connected in substantially parallel relationship to each other by means of a cross connecting support plate 23. The frame members 21, 22 are supported at an elevated position by means of conventional vertically extending support legs (not shown). As shown in FIGS. 1–3, the base frame means includes an upstanding tubular support member 24 which is adapted to support the cutting mechanism control means, as will be described in more detail hereinbelow.

As shown in FIGS. 2 and 3, the base frame 20 includes a pair of vertically extending parallel arranged support rods 25, 26. The support rods 25, 26 are detailed for axial sliding movement within complementary openings formed in an adjustable subframe 30. The adjustable subframe 30 includes a support block 31 in which the openings are formed for receiving the rod members 25, 26. Support block 31 is adjusted vertically relative to the support rods 25, 26 by means of a rotary crank means 32 having an upwardly extending adjustable control handle 33 and a downwardly extending shaft 34. Shaft 34 is provided with a threaded portion 35 which is threadably received within complementary threads (not shown) formed in the support block 31. The lower end of adjustable shaft 34 is supported for rotary non-axial adjustment relative to the support plate 23 by means of a collar 36. Adjustment of the rotary crank means 32 in one direction will effect an upper displacement of the support block 31 along the support rods 25, 26 and adjustment of the rotary crank 32 in opposite direction will effect a downward displacement of the support block 31.

As shown in FIG. 1, the support block 31 is provided with a pair of horizontally extended parallel arranged rod members 37, 38. The rod members 37, 38 provide guide track means for a carriage assembly 40 as will be described in more detail below. The rod members 37, 38 are supported in spaced relationship adjacent their extended ends by means of connecting brackets 39.

As shown in FIG. 1, the carriage assembly is generally represented by the reference numeral 40 and includes a first support bracket 41 and a second support bracket 42. Each of the support brackets 41, 42 includes sleeve members 43, 44, respectively, which are detailed to permit both rotary and axial sliding movement of the support brackets relative to the support rod 37. As shown in FIG. 3, the support bracket 41 is provided with a downwardly extending stud shaft 45 having a roller element 46. The stud shaft 45 is detailed in dimension for supporting roller 46 in rolling engagement with the support rod 38. As shown in FIG. 2, the support bracket 42 is provided with a downwardly extending stud shaft 47 rotatably supporting a roller 48. Shaft 47 is detailed in dimension for supporting roller 48 in rolling engagement with support rod 38.

Referring now particularly to FIG. 1, the support brackets 41, 42 are connected in a horizontally adjusted position relative to each other by means of a connecting rod 49. One end of the connecting rod 49 is secured in a fixed position relative to the support bracket 41 and an opposite end of the rod 49 is detailed for sliding engagement with a complementary opening formed in support bracket 42. The support bracket 42 is secured in a fixed position relative to the connecting rod 49 by means of a set screw locking assembly 49a.

The set screw locking assembly 49a will permit horizontal adjustment of the support brackets 41, 42 relative to each other and will permit the brackets to be secured in a selected adjusted position by securing the set screw means 49a.

As shown in FIGS. 1 and 3, bracket 41 is provided with a horizontal surface for supporting a motor drive means generally represented by the reference numeral 50. The motor drive means 50 is provided with a gear reduction housing 51 having a downwardly extending rotatable drive shaft 52. The downwardly extending end of drive shaft 52 is provided with a knurled friction drive member 53. The motor and knurled drive member 53 will provide both rotary displacement of the pattern and tubular member being cut and will provide horizontal adjustment of the carriage and cutting assembly. The frictional driving element 53 is constructed of a permanent magnet wherein the driving element will be magnetically attracted to the sloped surface of the pattern control means, to control horizontal adjustment of the carriage assembly 40. Motor 50 is controlled in a driving operation by means of a conventional electrical input supply line 54, a switch control means 55 and a speed control knob 56.

As shown in FIGS. 1 and 2, bracket 42 is provided with a forwardly projecting arm 42a having a supporting clamp means 42b and a rotary adjustment knob 42c. The clamp means 42b is detailed for supporting the cutting means 60. The cutting means 60 includes an elongated tubular member 61 having a cutting tip 62 on a lower end thereof and a gas receiving connection means 63 on the upper end. As shown in FIG. 2, the elongated tubular member 61 is provided with a rack member 64 having a plurality of gear teeth which are supported in driving engagement with complementary gear teeth formed on the rotary adjustment knob 42c. The gear teeth and adjustment knob will permit vertical adjustment of the cutting tip 62 relative to the workpiece in a cutting operation.

The cutting means 60 is constructed of conventional gas cutting mechanism wherein a mixture of oxygen and acetylene gases are introduced through supply lines 64, 65. Supply lines 64, 65 are provided with conventional control knobs 66, 67, respectively, which will permit the operator to adjust the flame produced by the cutting tip 62 to a desired cutting position. The control knobs 66, 67 are operatively associated with a supply manifold 68 which includes input supply lines 69 and 70 which are connected to conventional oxygen and acetylene supply means (not shown).

Referring now particularly to FIG. 1, the cutting apparatus embodying the principles of the present invention is detailed for making a predetermined cut on a tubular workpiece. The tubular workpiece is generally represented by the reference numeral 75. The cut on the tubular workpiece is made to correspond to a preformed template generally represented by the reference numeral 76. The tubular workpiece 75 and pattern 76 are supported in a cutting operation by a chuck assembly represented by the reference numeral 80. The chuck assembly is secured in a fixed position relative to the base frame by a pair of conventional U-bolts 81, 82 and a complementary support block 83. The chuck assembly 80 includes a housing 84 which rotatably supports shaft 85. One end of shaft 85 is fixed to a workpiece chuck mechanism 86 and an opposite end is fixed to a pattern chuck mechanism 87. The workpiece chuck mechanism 86 includes three radially adjustable chuck elements 88, 89, and 90. The adjustable chuck elements 88-90 are adapted to be radially adjusted by conventional means (not shown) and include axially extending lug portions which will engage the inner diameter of the tubular workpiece 75 and will secure the tubular workpiece 75 in a set position for rotary movement about the axis of shaft 85 which is concentric with the axis of the pattern 76. The pattern 76 is connected to the rotatable support shaft 85 by means of conventional drill bit chuck mechanism 86.

The chuck assembly 80 is detailed whereby the pattern 76 and tubular workpiece 75 are coaxially supported and freely rotatable about the axis of shaft 85, in a cutting operation. The chuck assembly 80 is detailed in its supported position for supporting the pattern 76 whereby the frictional driving element 53 can be positioned in abutting engagement therewith for rotating the pattern and workpiece and effecting adjustment of the carriage assembly with cutting means.

OPERATION

A cutting operation on a tubular pipe or tubing element utilizing the cutting apparatus of the present invention is performed by supporting the pipe or tubular element on the chuck mechanism 86. The tubular pipe is supported by adjusting the chuck elements 88-90 such that they will engage the inside diameter and securely clamp the pipe in a fixed position relative to the chuck assembly.

A pattern which is utilized for controlling the cutting operation is secured to the opposite side of the chuck assembly by chuck mechanism 87. After the pattern and tubular workpiece on which a cut is to be made have been secured in position on the chuck assembly 80, the drive means 50 is moved axially along the support guide rods 37, 38 until the knurled magnetic drive element 53 is in abutting engagement with the axially extending edge of the pattern 76. After the knurled magnetic driving element 53 has been placed in abutting engagement with the pattern 76, the bracket 42 supporting the cutting means 60 is adjusted axially relative to the connecting rod 49 until the cutting tip 62 is horizontally positioned at a desired location on which a cut is to be made. After the cutting tip 62 has been adjusted to a selected position, the set screw means 49a is adjusted to clamp the bracket 42 to the connected rod 49.

With the chuck assembly adjusted to support the workpiece and pattern and with the drive means 50 and cutting means 60 properly adjusted in a horizontally aligned position, the cutting means 60 is ignited by adjusting the control knobs 66, 67. After the cutting means 60 has been properly set, a cutting operation is performed by moving the control switch 55 to an on position wherein the drive motor 50 will effect rotation of the knurled magnetic driving element 53. Rotation of the knurled magnetic driving element 53 will cause the pattern 76 to be rotated about the chuck assembly support axis thereby rotating the tubular workpiece 75 relative to the cutting tip 62. As the tubular workpiece is rotated relative to the cutting tip 62, a cut will be made therethrough in a circumferential direction around the workpiece. Due to the magnetic attraction between knurled driving element 53 and the pattern 76, the knurled driving element 53 will move axially along the pattern 76 during rotary movement of the pattern. The axial movement of the knurled driving element 53 relative to the pattern will effect a horizontal adjustment of the drive means 50. Since the drive means 50 is connected through rod 49 to the cutting means 60, the cutting means will also be horizontally adjusted thus effecting an axial advancement of the cutting tip relative to the tubular workpiece 75, to thereby make a cut which will conform to the shaped surface of the pattern 76.

The horizontal adjustment between the drive means 50 and cutting means 60 provided by the connecting rod 49 and set screw means 49a will permit the cutting means 60 to make a cut at a selected horizontally adjusted position relative to the length of a tubular workpiece. Further, the vertical adjustment of the cutting means provided by the rack 64 and adjustment knob 42c will permit adjustment of the cutting tip 62 whereby a cut can be made in various diameters of tubular workpieces.

The carriage assembly which is supported for rotary movement about the guide rod 37 will permit the drive means 50 and cutting means 60 to be angularly displaced in a clockwise direction as shown in FIG. 2 during placement of the pattern and workpiece on the chuck assembly.

Referring now particularly to FIGS. 4-7, the steps utilized in forming the patterns used in making predetermined cuts in a tubular workpiece are schematically shown.

Figure 4:
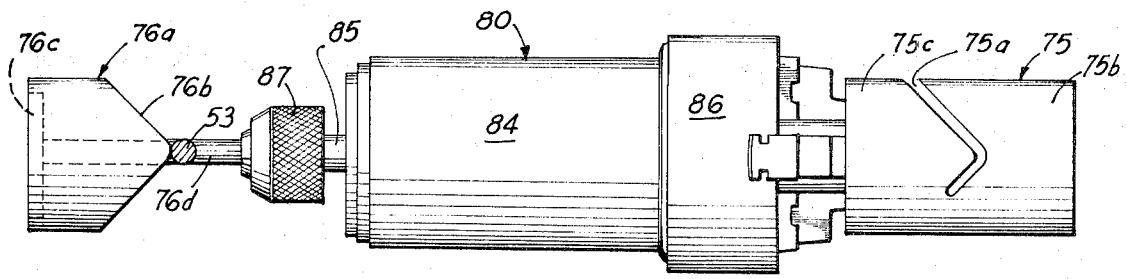
FIGS. 4 and 5 are schematic plan views showing the steps of using a master pattern to construct a first template utilizing the scrap from a finished part; and, FIGS. 6 and 7 are schematic plan views similar to FIGS. 4 and 5 showing the construction of a second template.
Figure 5:
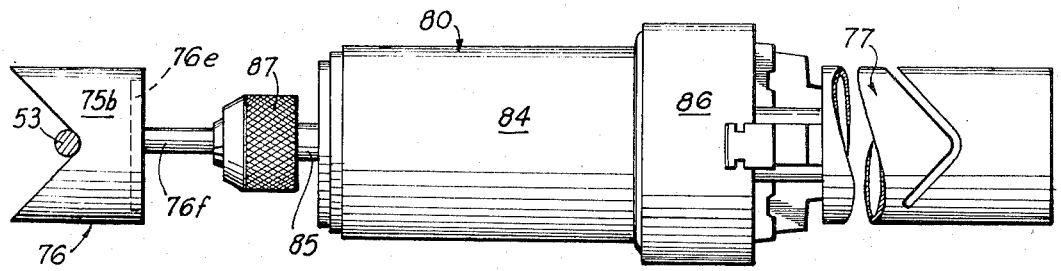

In utilizing the cutting machine embodying the principles of the present invention to make an angular cut as shown in FIGS. 1, 4 and 5, a master pattern 76a is prepared having the exact angular-shaped surface 76b as the required angular-shaped surface on the finished part 77 (FIG. 5). Master pattern 76a includes an end plate fixed to the master pattern by conventional means, such as welding, and has coaxially extending therefrom a support shaft 76d. The support shaft 76d is adapted to be inserted and securely clamped by the chuck assembly 87. After the master pattern 76a is secured in chuck assembly 87, and a workpiece is secured by the chuck assembly 86, the initiation of a cutting operation is effected wherein a cut 75a is made in the workpiece 75 under control of the knurled friction drive member 53 engaged with the master pattern 76a. The cut 75a will divide the tubular workpiece 75 into part 75c and complementary part 75b. It will appear that the angular-shaped surface produced on part 75c by cut 75a is the same as the angular-shaped surface 76b on the master pattern. However this is not true. The path of cut 75a is described by the path of the center of the knurled friction drive member 53 which is offset from surface 76b a distance equal to the radius of the knurled friction drive member 53. In a like manner it is seen that the angular-shaped surface produced on complementary part 75b by cut 75a is also offset. It can readily be seen that by using complementary part 75b as template 76, a cut can be made which will produce the desired finished part 77 having an angular-shaped surface corresponding to the angular-shaped surface 76b on master pattern 76a.

Figure 6:
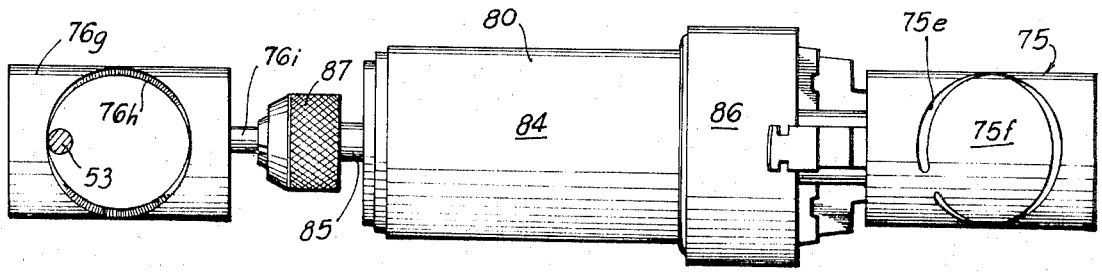
Figure 7:
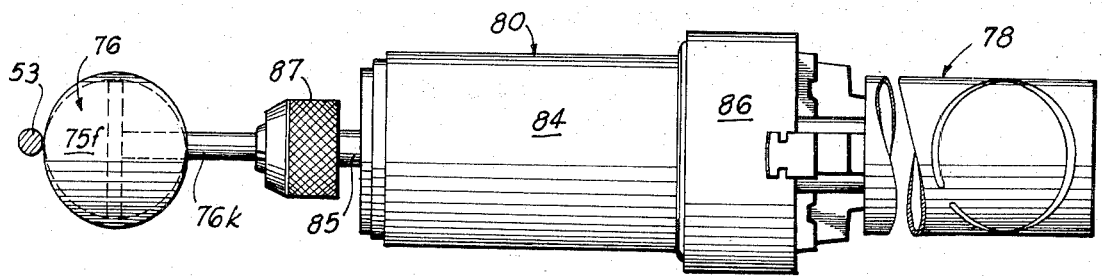

As shown in FIGS. 6 and 7, a desired finished part 78 can be produced having a circular opening. A master pattern 76g is prepared having a circular opening 76h the same as the required opening in finished part 78. The master pattern 76g is provided with a conventional coaxially extending support rod 76i which is inserted and securely clamped by the chuck assembly 87. With the master pattern 76g supported by the chuck assembly 87, and with a tubular workpiece in which a cut is to be made supported by the chuck assembly 86, a cutting operation is initiated wherein a cut 75e is made in the tubular workpiece 75 thereby leaving a complementary circular member 75f. After complementary circular member 75f has been cut from the tubular workpiece, the complementary member 75f is provided with a supporting rod 76k and becomes the template 76 which is used to make the cut in the finished part 78 having a circular opening corresponding to the circular opening 76h in the master pattern 76g.

From the above description of the steps of constructing a template to be used in making predetermined cuts in a tubular workpiece, it is apparent that any number of predetermined shaped cuts can be made in the tubular workpiece by first preparing a master pattern identical to the desired finished workpiece and using this master pattern to control the cutting of a complementary piece which is then used as a template to produce finished parts identical to the master pattern.

It now becomes apparent that the above described pipe cutting apparatus is capable of obtaining the above stated objects and advantages. It is obvious that those skilled in the art may make modifications in the details of construction without departing from the spirit of the invention which is to be limited only by the scope of the appended claims.

I claim:

1. Apparatus for use in making a predetermined cut, on a workpiece, corresponding to a pattern control means comprising, in combination:
   a. base frame means, including a pair of elongated track guide means;
   b. means on said base frame means for supporting a workpiece, on which a cut is to be made, and a pattern in fixed relationship with each other, said supporting means detailed to permit coordinated movement of said workpiece and said pattern relative to said base frame means;
   c. a carriage assembly supported for horizontal adjustment along said guide track means for movement relative to said base frame means and relative to said workpiece and pattern, said carriage assembly being supported on one of said guide track means for both rotary and axial sliding movement relative thereto and being supported in abutting engagement for sliding movement along said other guide track means.
   d. drive means on said carriage assembly operatively associated with said pattern for effecting said coordinated movement of said pattern and workpiece and for effecting controlled movement of said carriage in a cutting operation; and,
   e. means on said carriage for making said predetermined cut in said workpiece corresponding to said pattern in response to said coordinated movement of said carriage assembly.

2. Apparatus as defined in claim 1 further characterized in that said pair of guide track means is supported by a block assembly, with said block assembly being supported for vertical translating movement by a pair of guide rods, and wherein means is connected between said base frame means and said block assembly for effecting vertical adjustment of said carriage assembly along said guide rods.

* * * * *